July 9, 1929. W. G. McMURRAY 1,720,370
COMBINATION CLEAN OUT AND MANHOLE COVER
Filed Feb. 20, 1928
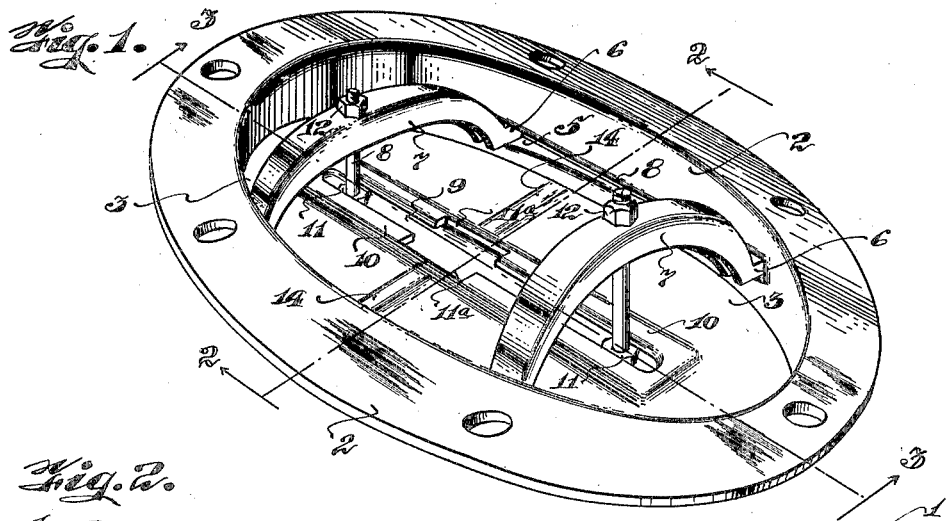
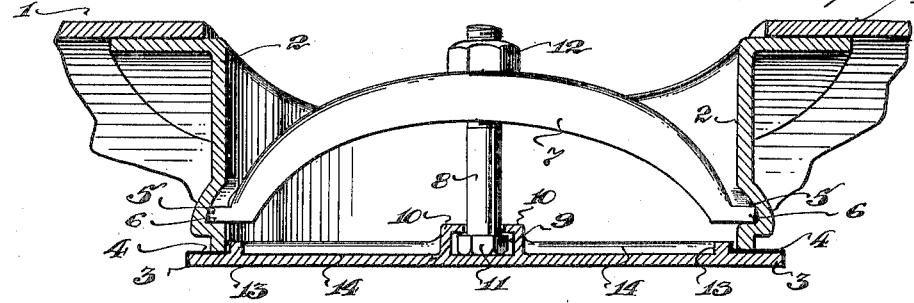
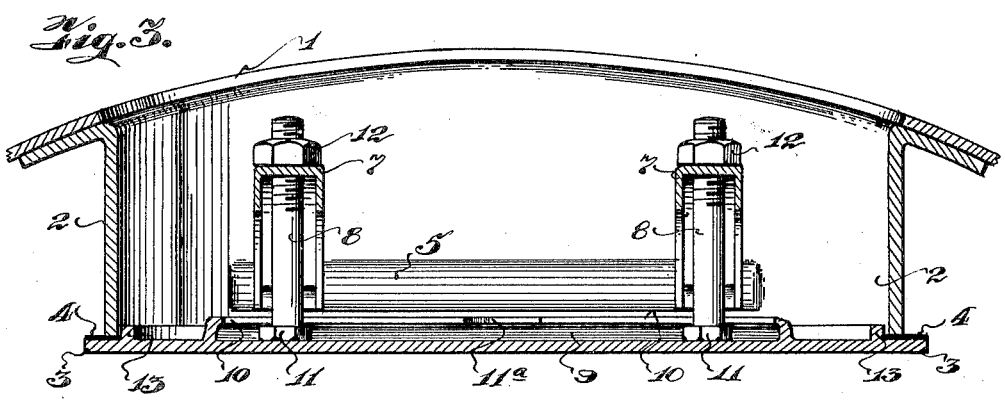
William G. McMurray
INVENTOR.
BY *Ernest A. Hood*
ATTORNEY Patented July 9, 1929.

1,720,370

UNITED STATES PATENT OFFICE.

WILLIAM G. McMURRAY, OF WICHITA FALLS, TEXAS, ASSIGNOR TO M. & V. TANK CO., OF WICHITA FALLS, TEXAS.

COMBINATION CLEAN-OUT AND MANHOLE COVER.

Application filed February 20, 1928. Serial No. 255,557.

This invention relates to manhole covers for tanks, cisterns, boilers and the like, and the invention has particular reference to an improved securing means for said covers and the principal object of the invention resides in the provision of a cover plate and securing means of the character specified, which, when applied to a manhole or clean-out opening in the side of the tank, boiler or cistern, as the case may be, will be flush with the outer periphery of the tank; that is to say, the highest point of the plate securing means will be inside of the wall of the tank, and as a consequence, the tank will be easier to handle and may be rolled on its side without the possibility of injury to the said plate securing means and rendering the same inoperative.

Heretofore, cover plates for openings in tanks, boilers and the like have been so arranged on the walls or heads as to require that the securing means therefor protrude beyond the common periphery of the tank, and since the most convenient way to handle the tank in moving the same a short distance is to roll them, especially in consideration of the sometimes great size of the tanks. It is obviously difficult or impossible to roll the tank when the said cover plate securing means protrudes from the side to interfere with the smooth rolling of the tank. Not only is it a disadvantage in transporting the tank by rolling to have the said securing means protruding from the side, but likewise increases the possibility of injury to the latter, either springing or permanently impairing the same.

It is obviously practical and more convenient to arrange the said cover plate and its associated securing elements below or flush with the common periphery of the tank to enable the latter to be more readily handled yet without possibility of injury to the said securing elements.
With the foregoing objects as paramount, the invention has particular reference to its salient features of construction and arrangement of parts to be hereinafter specified and described, and illustrated in the accompanying drawings wherein;

Figure 1 represents a perspective view of the improved cover plate and securing means.

Figure 2 is a lateral sectional view on lines 2—2 of Figure 1, and

Figure 3 is a longitudinal sectional view on lines 3—3 of Figure 1.

Continuing now more in detail with the drawings, 1 designates the tank, boiler or cistern wall, fragmentarily shown, to which is riveted, welded, or otherwise suitably secured the flanged collar 2. This collar is so arranged at its top to conform with the contour of the wall of the tank, either outside or inside, but preferably the latter as shown. Irrespectively, the bottom of the collar 2 is flat to be snugly engaged by the cover plate 3, but having an interposing annular packing ring 4 therebetween.

In the side walls of the collar 2, and diametrically opposite, are elongated recesses 5, formed preferably by indenting the metal forming said walls in the manner shown. These recesses receive the ends 6 of the yokes 7, which latter, after being placed along near the center of the recess, are moved oppositely toward either end of the said recesses, until the proper position is reached to obtain equal pressure at either end of the plate 3, after securing the bolts 8.

In Figures 2 and 3 is shown one form of movably connecting the bolts 8 to the plate to enable the same to be freely moved lengthwise of the plate for proper placing of the yokes 7. In casting the plate 3, a groove 9 is formed through its center having flanges 10 to retain the bolt head 11, whereby the latter may be capable of free movement along the groove so formed. Other means of loosely connecting the bolts to the plate 3, however may be resorted to if desired. To effect removal of the bolts from the plate 3, it is required only to slide the same to the central enlargement 11ª made in the flanges 10, through which they may be readily withdrawn.

The bolts 8, extending through the yokes 7 are threaded to receive nuts 12, and by tightening these nuts against the yokes, with equal pressure, the plate 3 is brought upward against the lower end of the collar, compressing the flexible packing ring 4, which is permitted to expand only in one direction by the restriction formed by the annular ridge 13 integral with the plate 3. As a strengthening medium for the cover plate 3, a lateral rib 14 is cast thereon.

From the foregoing, it is obvious that due to the countersunk position of the invention in the wall of the tank, the latter may be readily rolled without injury to the yokes 7, ordinarily standing out beyond the surface of the tank, and yet providing the maximum of pressure of yokes 7 to positively hold the plate 3 against displacement.

Obviously, certain modifications may be resorted to if desired, without departing from the spirit or intent of the invention as set forth in the following claims.

What is claimed is:—

1. A combination cleanout and manhole cover plate and securing means for tanks and the like comprising a flanged collar adapted for securement to said tank whereby to extend inward and having oppositely disposed elongated recesses in its sides near the bottom thereof, a plate arranged to snugly conform with the bottom of said collar; yokes movably secured to said plates, the ends of which are receivable in said recesses, and means to bind said yokes to draw said plate tightly against the bottom of said collar.

2. A combination cleanout and manhole cover and securing means for tanks and the like including a flanged collar adapted to be so affixed to the tank as to extend inwardly thereof and provided with diametrically opposed, elongated recesses in its sides adjacent the bottom of said collar; a plate arranged to conform with the bottom of said collar to close the opening through the latter; yokes so connected to said plate as to be capable of free movement endwise of the latter the ends of which are arranged to be received by said recesses so as to bring the highest point of said yoke within the circumference of said tank, and means for securing said yoke to bring said plate tightly against the bottom of flanged collar.

3. A combination cleanout and manhole cover for tanks and the like, composed of a collar secured to the tank and projecting into the tank interior and having opposed holding means on the interior of the collar, a cover member engaged with the bottom of the collar to close the latter, a bridging member having parts removably engaging the holding means, and means connected to the cover member and to the bridging member for drawing the cover member tightly against the bottom of the collar.

4. A combination cleanout and manhole cover for tanks and the like, composed of a collar secured to the tank and projecting into the tank interior and having opposed holding means on the interior of the collar, a cover member engaged with the bottom of the collar to close the latter, a bridging member having parts removably engaging the holding means, and means connected to the cover member and to the bridging member for drawing the cover member tightly against the bottom of the collar, said means including a bolt, spaced flanges on the cover member to receive and engage the head of the bolt and to hold same against rotation and against outward movement, said bolt extending through the bridging member, and a nut on the bolt engaging the bridging member for drawing the cover member tightly against the bottom of the collar.

5. A combination cleanout and manhole cover for tanks and the like, composed of a collar secured to the tank and projecting into the tank interior and having opposed recesses which open into the collar interior, a cover member engaged with the bottom of the collar to close same, a bridging member having ends removably engaged in the recesses, a bolt connected to the upper face of the cover member and extending through the bridging member, and a nut on the bolt engaging on top of the bridging member.

6. A combination cleanout and manhole cover for tanks and the like, composed of a collar secured to the tank and projecting into the tank interior and having opposed longitudinal recesses which open into the collar interior, a bridging member having ends movable into and out of the recesses by sliding of the ends of the member, a cover member engaged with the bottom of the collar to close same, and means connected to the bridging member and to the cover member to move the latter against the bottom of the collar.

In testimony whereof I affix my signature.

WILLIAM G. McMURRAY.